United States Patent
McMillan

(10) Patent No.: US 6,658,994 B1
(45) Date of Patent: Dec. 9, 2003

(54) MODULAR ASSEMBLY FOR A HOLDING CABINET CONTROLLER

(75) Inventor: Thomas A. McMillan, Nashville, TN (US)

(73) Assignee: Chromalox, Inc., Pittsburgh, PA (US)

( * ) Notice: Subject to any disclaimer, the term of this patent is extended or adjusted under 35 U.S.C. 154(b) by 0 days.

(21) Appl. No.: 10/403,360

(22) Filed: Mar. 31, 2003

Related U.S. Application Data
(60) Provisional application No. 60/371,328, filed on Apr. 10, 2002.

(51) Int. Cl.[7] ............................ A23L 1/00; A47J 39/02; H05B 1/02; F25B 13/00; F27D 11/00
(52) U.S. Cl. ........................ 99/468; 99/448; 99/331; 99/483; 219/214; 219/386; 219/392
(58) Field of Search .................... 99/326–333, 339, 99/335, 340, 448, 467–468, 476, 474, 473, 357, 483, 484, 485; 221/150 A, 150 AC, 211, 249, 224; 219/214, 386, 521, 392, 385, 486, 506, 400, 494, 492; 312/236, 128; 62/251–256; 705/1, 2, 90

(56) References Cited

U.S. PATENT DOCUMENTS

| | | | |
|---|---|---|---|
| 5,093,556 A | | 3/1992 | Oelfke |
| 5,188,020 A | | 2/1993 | Buchnag |
| 5,203,255 A | * | 4/1993 | Wells et al. .................. 99/468 |
| 5,553,934 A | * | 9/1996 | Wells et al. ............ 312/236 X |
| 5,579,952 A | | 12/1996 | Fiedler et al. |
| 5,772,072 A | | 6/1998 | Prescott et al. |
| 5,875,430 A | | 2/1999 | Koether |
| 5,900,173 A | | 5/1999 | Robards, Jr. |
| 5,947,012 A | * | 9/1999 | Ewald et al. ............. 99/483 X |
| 6,011,243 A | | 1/2000 | Arnold et al. |
| 6,116,154 A | | 9/2000 | Vaseloff |
| 6,175,099 B1 | * | 1/2001 | Shei et al. ................ 99/483 X |
| 6,262,394 B1 | * | 7/2001 | Shei et al. ................ 99/483 X |
| 6,412,403 B1 | * | 7/2002 | Veltrop ..................... 99/467 X |
| 6,453,802 B1 | * | 9/2002 | Manganiello et al. ..... 99/468 X |
| 6,541,739 B2 | * | 4/2003 | Shei et al. ................ 99/483 X |
| 2000/0082924 | | 6/2002 | Koether |

OTHER PUBLICATIONS

Dave Johnson, The Real World Palm, Handheld Computing Enterprise electronic newsletter, Jul. 17, 2002, Issue 18, available at http://www.hhcmag.com.

Prince Castle Inc. Worldwide, DHB4PT–20 Dedicated Holding Bin (04/02), available at http://www.princecastle.com.

Software Horizons Inc., Instant HMI (last modified Mar. 12, 2003), available at http://www.instanthmi.com.

North American Association of Food Equipment Manufacturers—The NAFEM Show, available at http://www.nafem.org, undated.

* cited by examiner

*Primary Examiner*—Timothy F. Simone
(74) *Attorney, Agent, or Firm*—Kirkpatrick & Lockhart LLP

(57) ABSTRACT

A cabinet maintains one or more food products at a predetermined temperature. In one general aspect, the cabinet includes at least one modular shelving unit capable of interconnecting with one or more additional modular shelving units. Each modular shelving unit includes a passageway for storing food products, a display for presenting information regarding food products stored in the passageway, and a control system for individually controlling the operations of the modular shelving unit.

20 Claims, 8 Drawing Sheets

MODULAR ASSEMBLY FOR A HOLDING CABINET CONTROLLER

This application claims the priority benefit of U.S. Provisional Application No. 60/371,328 filed on Apr. 10, 2002 and incorporated by reference in its entirety.

TECHNICAL FIELD

This invention generally relates to a control system for a holding cabinet and, more particularly, to a modular assembly for a holding cabinet controller capable of maintaining food products stored in the holding cabinet at an appropriate temperature and conveying information regarding the stored food products.

BACKGROUND

In today's demanding and fast-paced marketplace, customers frequently patronize establishments that consistently delivery a quality product in a short period of time. This is especially true in the food service industry, where "fast food" restaurants compete to deliver food products as quickly as possible while preserving the quality of the taste, consistency, and appearance of the food.

Due to time constraints inherent in the fast food industry, it would be inefficient to display food preparation until after a customer has placed an order. Instead, food typically is cooked and then stored in a holding cabinet, for example, before ultimately being distributed to a customer. In general, the holding cabinet is designed to store food at temperatures sufficient to preserve the quality of the food and to enable the food to be served quickly. Such temperatures must be carefully monitored in order to avoid overcooking and reheating which may detrimentally alter the quality of the food.

Operators of fast food restaurants may face further challenges as such establishments often maintain a large volume of different food products. Each type of food product may present different requirements. For example, different foods may require different storage temperatures and may have different shelf lives, i.e., time limits after which the food products are no longer sellable and must be destroyed. As the number of offered food products increases, so does the complexity of a system capable of maintaining all the different types of food products.

Accordingly, there exists a need for a holding cabinet and control system structured and arranged to maintain multiple categories of food products and to convey information regarding food products stored in the holding cabinet.

SUMMARY

In one general aspect, a cabinet maintains one or more food products at a predetermined temperature. The cabinet may include at least one modular shelving unit capable of interconnecting with one or more additional modular shelving units. Each modular shelving unit may include a passageway for storing food products, a display for presenting information regarding food products stored in the passageway, and a control system for individually controlling the operations of the modular shelving unit.

Implementations may include one or more of the following features. For example, the modular shelving unit may include at least one bezel assembly and/or a heater assembly. The bezel assembly may include a display screen and a slot forming an opening of the passageway. The display screen may include a vacuum florescent display and include touch screen functionality.

The heater assembly may maintain food products at a particular temperature and may include frame components supporting a top heater plate and bottom heater plate. The frame components may include interconnection wiring capable of communicating with interconnection wiring of one or more additional modular shelving units. The heater assembly may include a temperature sensor for providing temperature detection signals to the control system. At least part of the control system may be included within the bezel assembly and/or the heater assembly.

The modular shelving unit may include a position sensor for detecting location of food products within the passageway. The position sensor may provide position indication signals to the control system.

The control system may include switching circuitry for controlling the temperature of the passageway. The control system may include a network interface for sending and receiving communication data (e.g., infrared communication data and/or radio frequency communication data). The network interface may include a modem, communication card, transmitter, and/or a network adapter.

Aspects of the present invention may be implemented by an apparatus and/or by a computer program stored on a computer readable medium. The computer readable medium may include a disk, a device, and/or a propagated signal.

Other features and advantages will be apparent from the following description, including the drawings, and from the claims.

DETAILED DESCRIPTION

Figure 1:
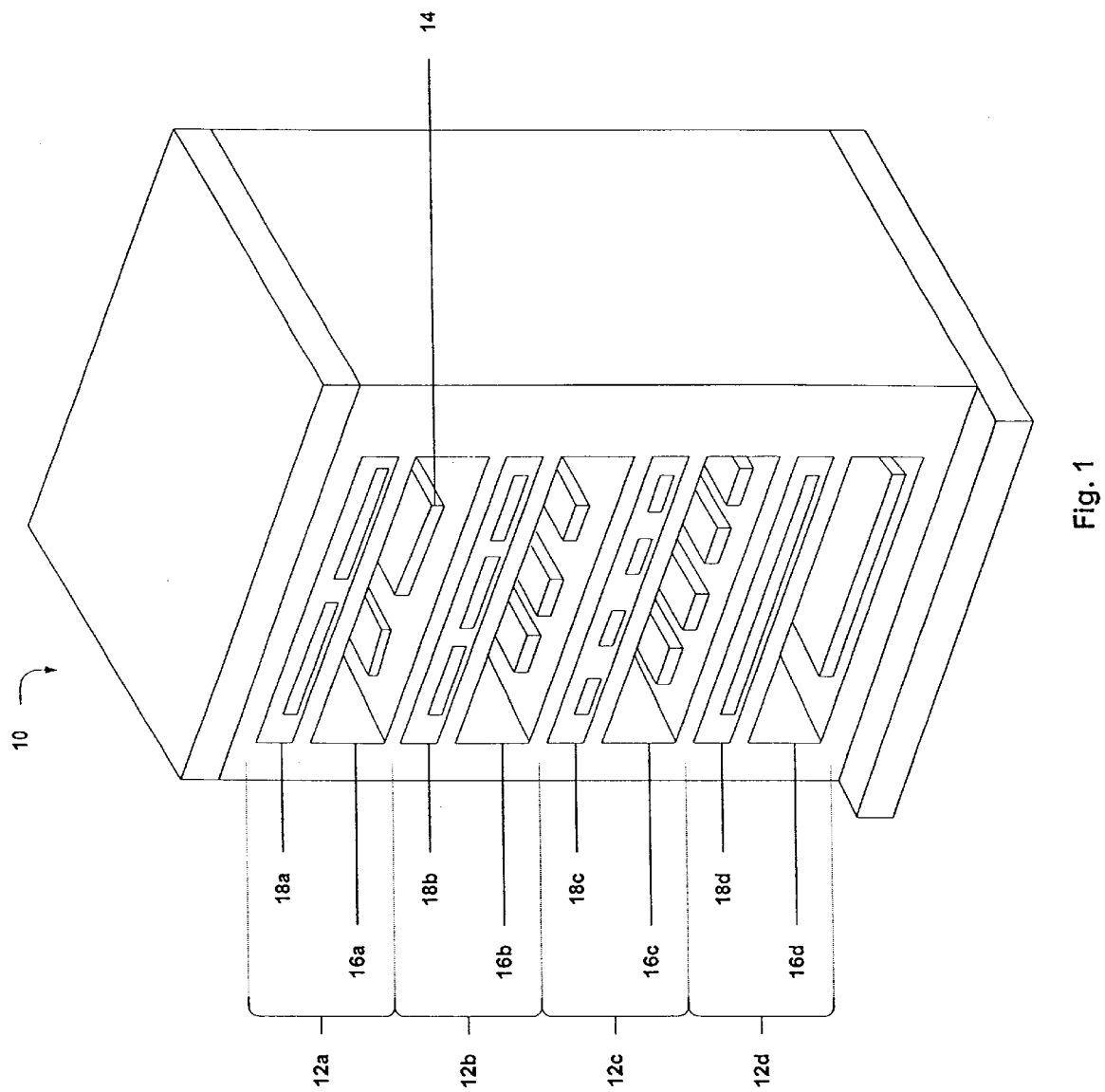
FIG. 1 illustrates aspects of a holding cabinet according to one embodiment of the present invention.

FIG. 1 illustrates aspects of one implementation of a holding cabinet 10 configured to store multiple categories of food products and to convey information regarding the stored food products. As shown, the holding cabinet 10 includes a plurality of shelving units 12a–d for storing one or more food products 14 that are to be maintained in a temperature-controlled environment, i.e. served warm. Examples of food products 14 may include, but are not limited to, breakfast foods (e.g., eggs, bacon, sausage, pancakes, biscuits), sandwiches (e.g., hamburgers, chicken, fish), entrees (e.g., fried chicken, pizza, burritos), side orders (e.g., french fries, nuggets, pies), and/or any other type of typical "fast food" item. Each food product 14 may be served in a container such as box, wrapping, or tray and placed in the shelving units 12a–d after cooking and preparation.

Each shelving unit 12a–d may include a passageway 16a–d for receiving food products 14 and at least one corresponding display panel 18a–d for conveying information (e.g., description, type, category, temperature, time) regarding the stored food products 14. In some implementations, each passageway 16a–d may be open at both ends, providing each shelving unit 12a–d with a pass-through structure. In this way, operators may access the passageways 16a–d from the front and/or from the rear of the holding cabinet 10. Consequently, a first operator may load food products 14 into the shelving units 12a–d from the front of the holding cabinet 10, and a second operator may remove food products 14 out of the shelving units 12a–d from the rear of the holding cabinet 10. In such implementations, each shelving unit 12a–d may include both front and rear display panels synchronized to display identical information. In other implementations, the passageways 16a–d may be structured only with a single opening, requiring the food products 14 to be loaded and removed from the same side of the holding cabinet 10. In such cases, each shelving unit 12a–d may include only one display panel.

In one implementation, each passageway 16a–d may be capable of receiving up to four different categories of food products 14, and each display panel 18a–d may be configured to convey information corresponding to the number of different categories or types of food products 14.

For instance, in the implementation of FIG. 1, a first display panel 18a indicates that two categories of food products are stored in the passageway 16a of the first shelving unit 14a. Similarly, the second display panel 18b indicates that three categories of food products are stored in the passageway 16b of the second shelving unit 12b, the third display panel 18c indicates that four categories of food products are stored in the passageway 16c of the third shelving unit 12c, and the fourth display panel 18d indicates that one category of food product is stored in the passageway 16d of the fourth shelving unit 12d. Implementations of each display panel 18a–d are discussed in greater below in conjunction with FIGS. 5a–d.

In some implementations, the holding cabinet 10 may be structured as a combination of modular units. For example, the shelving unit 12a may be a modular unit that may be combined, i.e. stacked, with other modular units 12b–d to form the holding cabinet 10.

Figure 2:
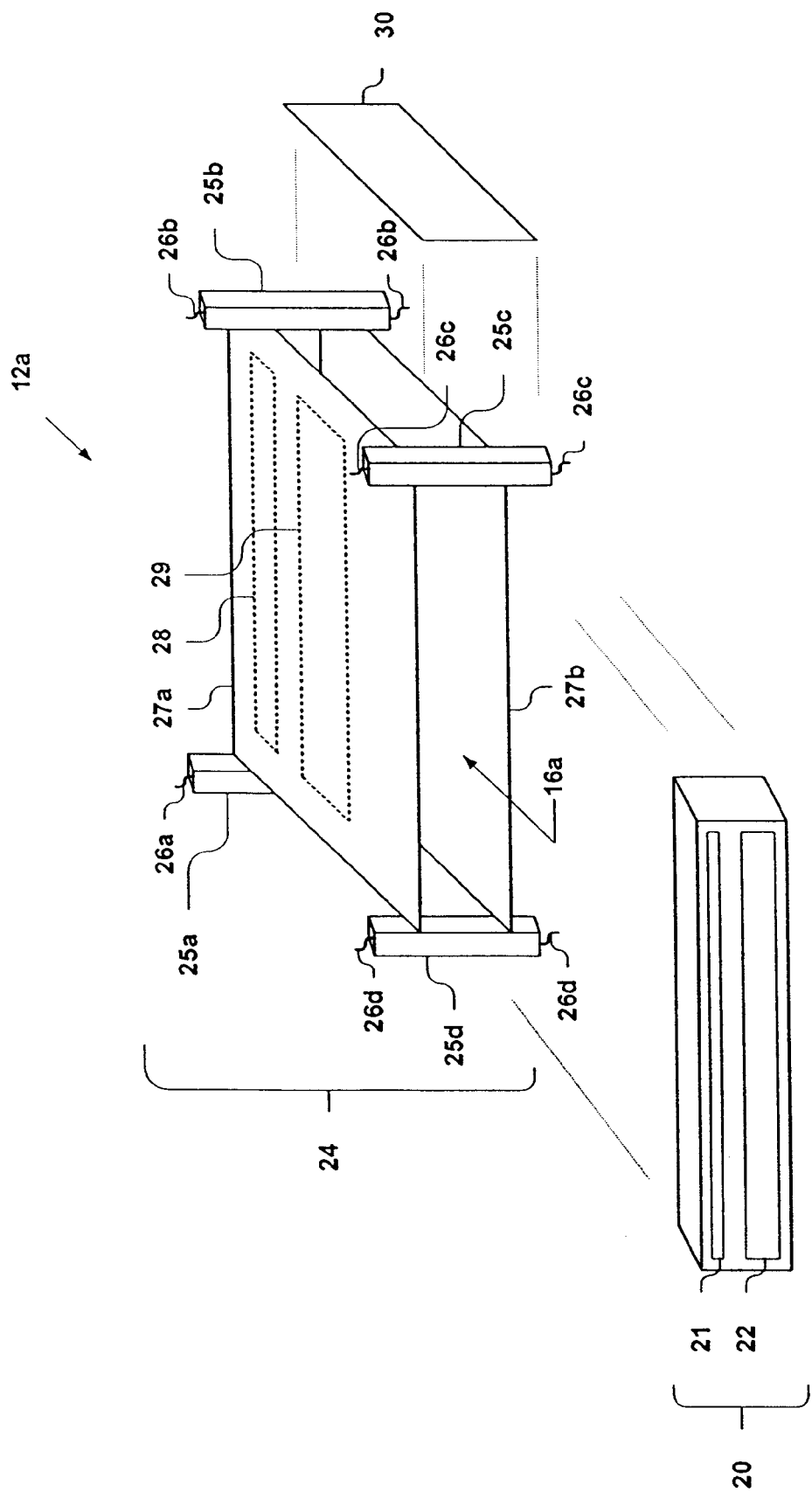
FIG. 2 illustrates aspects of a modular holding cabinet assembly according to one embodiment of the present invention.

FIG. 2 illustrates aspects of one implementation of a modular shelving unit 12a. As shown, the modular shelving unit 12a includes at least one bezel assembly 20 for displaying product information and a heater assembly 24 for maintaining food products at a particular temperature. In general, the bezel assembly 20 and the heater assembly 24 respectively form at least part of the display panel 18a and the passageway 16a of FIG. 1.

As shown, the bezel assembly 20 includes a display screen 21 and a slot 22 for receiving food products. The bezel assembly also may include one or more sealed thermal barriers (not shown) to protect the display screen 21 from excessive temperatures. Additionally, the bezel assembly 20 may utilize convection air flow, thus eliminating the need for fans.

In one implementation, the display screen 21 includes a display such as, for example, a high-resolution vacuum florescent display (VFD), a liquid crystal display (LCD), and/or individual light emitting diodes (LEDs). In general, the display screen 21 may present alphanumeric characters and/or graphics in one or more colors and/or intensities to emphasize different operational conditions. The display screen 21 may be configured to provide full names and detailed descriptions of food products and may include graphical character sets and changeable font sizes.

The display screen 21 also may include intensity control for highlighting the names of certain food products. For example, the names of food products that are to be used first may be highlighted in order to draw the attention of operators. In one implementation, the display screen 21 includes individual LEDs and uses the decimal point (a running dots pattern) with the intensity to get the operator's attention.

Additionally, the display screen 21 may include a touch screen with graphical icons indicating particular touch locations for an operator to press. The display screen 21 may present program functions including on-screen information, pull down menus, text-entry windows, and/or other programming prompts.

In general, the slot 22 forms an opening to passageway 16a. Although not illustrated in FIG. 2, the modular shelving unit 12a may include a second bezel assembly, i.e. rear bezel assembly. In such implementations, the slot of the second bezel assembly forms a second opening, and the passageway 16a provides the shelving unit 12a with a pass-through structure.

In one implementation, the heater assembly 24 includes frame components 25a–d containing interconnection wiring 26a–d. In general, the frame components 25a–d and the interconnection wiring 26a–d provide at least part of the modular design of the shelving unit 12a. That is, the frame components 25a–d may be designed to connect with the frame components of one or more other modular units (e.g., shelving units 12b–d). Similarly, the interconnection wiring 26a–d may connect with the interconnection wiring of one or more other modular units. The interconnection wiring 26a–d may include power lines and/or communication lines for providing serial connections among the modular units (e.g., shelving units 12a–d). In this way, the modular shelving unit 12a may communicate with one or more other modular units (e.g., shelving units 12b–d).

Each of the frame components 25a–d may support a top heater plate 27a and a bottom heater plate 27b. In general, the top heater plate 27a and the bottom heater plate 27b are structured to radiate heat within the passageway 16a of the modular shelving unit 12a. Each of the heater plates 27a, 27b may be individually controlled to maintain a certain temperature set by an operator. In some cases, the top heater plate 27a and the bottom heater plate 27b may be set to maintain the passageway 16a at a constant uniform temperature. In other cases, each of the heater plates 27a, 27b may include customizable heating elements arranged such that different portions of the passageway 16a may be set to different temperatures. In this way, the temperature of each passageway may be maintained according to the number and types of food product to be stored. For example, the passageway 16a may be set to store four different types of food products at four different temperatures.

In order to regulate the temperature of the passageway 16a, the top heater plate 27a and/or bottom heater plate 27b may include a temperature sensor 28. In one implementation, the temperature sensor 28 includes one or more resistive temperature detectors (RTDs) configured to detect the temperature at one or more locations within the passageway 16a. Temperatures may be determined from the RTDs, for example, by detecting the resistance of the RTDs using bridge circuits and/or by multiplexing a constant current source into each of the RTDs. The temperature sensor 28 may transmit temperature feedback signals in response to detected temperatures. The temperature feedback signals may be capable of triggering an alarm sequence and/or initiating a temperature control procedure, as discussed below.

The top heater plate 27a and/or the bottom heater plate 27b also may include a position sensor 29. In general, the position sensor 29 may be configured to detect the presence, number, and location of items (e.g., food products 14) within the passageway 16a. In one implementation, the passageway 16a is segmented into four distinct areas (i.e., far left, middle left, middle right, and far right) along its width for storing food products. Accordingly, the position sensor 29 may detect whether food products are present in each of four possible areas and also may detect whether spacing is present between detected food products. In this way, the exact number and location of food products may be determined. For example, the position sensor 29 may detect that the passageway 16a contains two food products—a small food product occupying a far left position and a large food product occupying the middle right and far right positions.

In an alternate implementation, the passageway 16a is not necessarily segmented into distinct areas. Rather, the position sensor 29 may be configured to detect up to four food products located anywhere along the width of the passageway 16a. For example, the position sensor 29 may detect the horizontal position of the beginning and ending edges for each food product. In this way, the position sensor 29 may report the precise size and location of up to four food products placed in the passageway 16a.

The modular shelving unit 12a also includes a control system 30 for communicating with and controlling one or more bezel assemblies 20 (e.g., front and rear bezel assemblies) and the heater assembly 24. Additionally, the control system 30 may communicate through an external network, as discussed below. The control system 30 may contribute to the modular design of the holding cabinet by providing individual control for the shelving unit 12a. In the implementation of FIG. 2, the control system 30 forms part of the heater assembly 24. In other implementations, however, some or all of the aspects of the control system may be included in the bezel assembly 30.

In general, the control system 30 communicates with the bezel assembly 20 and the heater assembly 24 in order to display product information and provide temperature control. For example, the control system 30 may transmit display commands to the display screen 21 of a front and/or rear bezel assembly 20 for displaying particular information. The control system 30 may transmit temperature adjustment commands to power-switching circuits that furnish power individually to the top heater plate 27a and the bottom heater plate 27b in order to maintain a set temperature within the passageway 16a.

Figure 3:
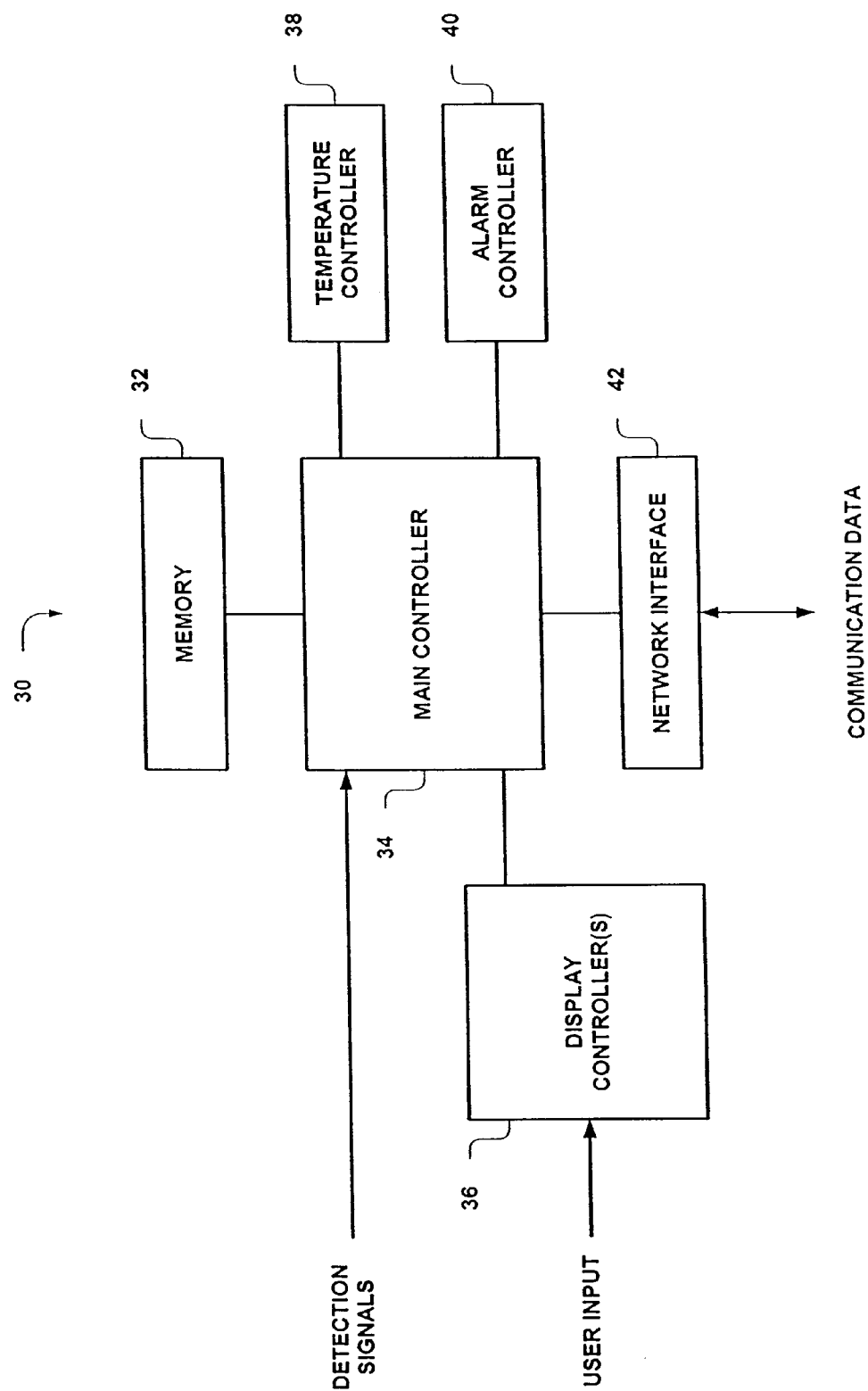
FIG. 3 illustrates aspects of a holding cabinet control system according to one embodiment of the present invention.

FIG. 3 illustrates aspects of one implementation of a control system 30. As shown, the control system includes a memory 32, a main controller 34, one or more display controllers 36, a temperature controller 38, and alarm controller 40, and a network interface 42. The control system 30 may generate commands in response to user inputs, detection signals, and/or communication data received from various sources including, but not limited to, user interfaces (e.g., touch screen, key pad), condition detectors (e.g., a temperature sensor 28, a position sensor 29), and or network interfaces (e.g., communication cards, serial connections).

In general, the memory 32 may include any type of computer-readable storage capable of storing data. Examples include, but are not limited to, EPROM for storing permanent data, EEPROM for storing operator programmable data, and/or RAM for storing temporary data. Each controller (e.g., main controller 34, display controller 36, temperature controller 38, alarm controller 40) generally may include any type of processing device capable of responding to and executing instructions. For example, each controller may include a microprocessor, integrated circuit, circuit board, and/or any other structure configured to execute a computer program. The network interface 42 generally may include any type of communications interface enabling wired or wireless communication. Examples include, but are not limited to, a modem, a transceiver, a communication card (e.g., a RS485 to RF and/or a RS485 to IR communication card), a transmitter, and/or another network adapter capable of transmitting and receiving data over a wired or wireless data pathway.

In one implementation, the memory 32 stores a control program including instructions for directing the operation of the modular shelving unit 12a. The main controller 34 may interface with the memory 32 and execute the control program. Under the direction of the control program, the main controller 34 may control the operation of the shelving unit 12a. In particular, the main controller 34 may interact with one or more display controllers 36, the temperature controller 38, the alarm controller 40, and/or the network interface 42, as described below.

The main controller 34 may communicate with one or more display controllers 36 in order to display a particular message on an appropriate display panel 18a. In one implementation, each display controller 36 is associated with a particular display panel 18a and/or bezel assembly 20. As such, in implementations where the shelving unit 12a has front and rear display panels, the control system 30 typically will include two display controllers 36.

The display controller 36 may receive message information from the main controller 34. The message information may include header information identifying at least one appropriate display controller 36 and display information (e.g., ASCII characters) indicating the particular message to be presented. The display controller 36 may translate the message information into bit patterns, interface with a corresponding display panel (e.g., display panel 18a), and direct the display panel to present the particular message. The particular message may include the name of a stored food product, a set temperature, and/or timer information, for example.

The display controller 36 also may receive user input from operators. In one implementation, the display panel 18a may include a touch screen and/or key pad for receiving user input. Examples of user input include, but are not limited to, operating mode (e.g., on, off, cleaning mode, service mode, test mode), shelving unit selection, position selection, product selection, timer settings, temperature settings, meal settings, and/or alarm preferences. Upon receiving the user input, the display controller 36 forwards the user input to the main controller 34.

The main controller 34 may receive the user input from the display controller 36 and, in response, may control the operations of the shelving unit 12a including instructing the individual display controllers 36 to display certain messages and/or controlling the temperature of the passageway 16a. In addition, the main controller 34 also may receive certain detection signals (e.g., temperature feedback signals, position indication signals) and accordingly control the operations of the shelving unit 12a. In particular, the main controller 34 may receive temperature feedback signals from a temperature sensor 28 and, in response, communicate with the temperature controller 38 in order to maintain appropriate temperatures within the passageway 16a and/or an alarm controller in order to alert an operator of adverse temperature conditions. Additionally, the main controller 34 may receive position indication signals from a position sensor 29 and, in response, instruct the display controllers 36 to display certain user interfaces according to detection signals received.

In general, the main controller 32 may communicate with the temperature controller 38 in order to maintain appropriate temperatures within the passageway 16a. In one implementation, the temperature controller 38 may include switch circuitry corresponding to one or more heater plates (e.g., top heater plate 27a and bottom heater plate 27b). The switch circuitry may be configured to furnish each heater plate with power by closing a circuit between the heater plate and one or more powers lines, for example. The switch circuitry also may be configured to cut off power to the heater plate in order to lower the temperature of the corresponding passageway. The switch circuitry may include devices such as solid state switches, mechanical and/or solid state relays.

The main controller 34 may communicate with the alarm controller 40 in order to alert an operator of an adverse condition, i.e., an alarm condition. In one implementation, the alarm controller 40 is configured to generate and an audible and/or visual alarm in the event of a detected alarm condition. The alarm controller also may be configured to disable timers and/or heating elements during an alarm condition. An alarm condition may occur in the event that the detected temperature varies from a preset temperature by more than a threshold value (e.g., ±5° F.) for longer than a threshold period of time (e.g., 2 minutes), for example. An alarm condition also may occur where a detected temperature is lower than the minimum temperature (e.g., 140° F.) required for a particular food product, a defective sensor is detected, and/or the passageway temperature fails to achieve the set temperature within a certain period of time.

The main controller 34 may send and/or receive communication data through the network interface 42. In one implementation, the main controller 34 may receive communication data including user instructions and, in response, may control the operations of the shelving unit 12a including instructing the individual display controllers 36 to display certain messages and/or controlling the temperature of the passageway 16a. In another implementation, the main controller 34 may compile and send communication data including holding cabinet information (e.g., operation mode, stored food products, temperature settings, timer settings) through the network interface 42. Such communication data including the holding cabinet information may be received and displayed by a remote user using a personal computer, mobile telephone, and/or Web-enable handheld device.

Figure 4:
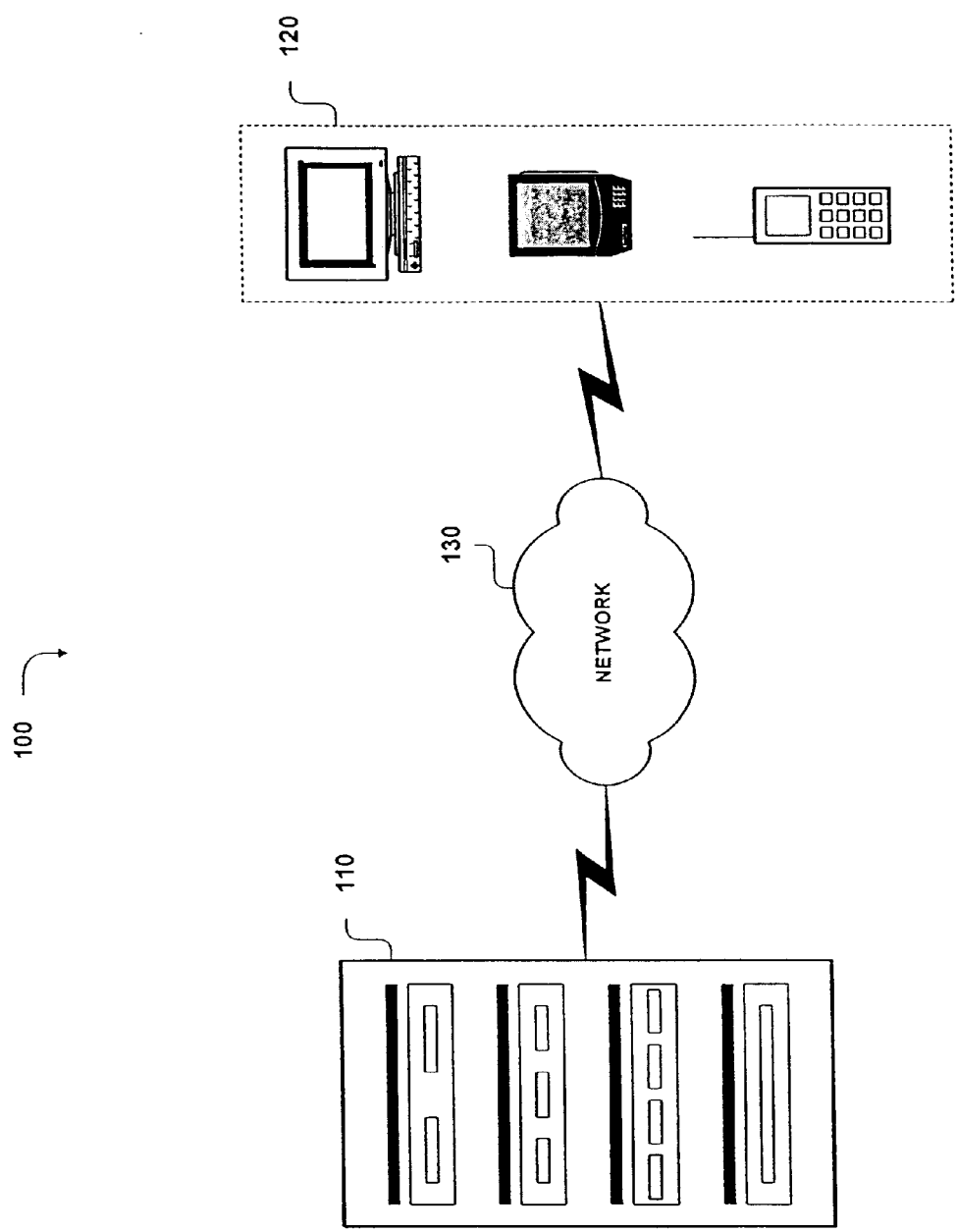
FIG. 4 illustrates aspects of a communications system for conveying holding cabinet information according to one embodiment of the present invention.

FIG. 4 illustrates aspects of a communication system 100 for conveying holding cabinet information. As shown, the communication system 100 includes a holding cabinet system 110 connected to a client system 120 through a network 130. In one implementation, the holding cabinet system 110 is configured to provide holding cabinet information to the client system 120. Examples of holding cabinet information include, but are not limited to, operating mode information (e.g., on, off, cleaning mode, service mode, test mode), shelving unit information, food product position, food product description, start time, stop time, time remaining, set temperature, detected temperature, current meal, and/or alarm status. In general, the holding cabinet information may include any type of information that may be presented to an operator through a display panel (e.g., display panel 18a). Digital communication of holding cabinet information allows for simplified set-up and operation of the holding cabinet system 110. In particular, such communication provides methods for monitoring the status of product temperatures and timers to assure proper operation of the equipment and food handling procedures.

Each of the holding cabinet system 110 and the client system 120 may include a computer system having hardware and/or software components for communicating with the network 130 and with each other. The holding cabinet system 110 and the client system 120 each may include one or more general-purpose computers (e.g., personal computers and/or servers), one or more special-purpose computers (e.g., devices specifically programmed to communicate with each other), or a combination of one or more general-purpose computers and one or more special-purpose computers. The holding cabinet system 110 and the client system 120 may be structured and arranged to communicate using various communication protocols (e.g., http, WAP) and encapsulation protocols (e.g., UDP) to establish connections (e.g., peer-to-peer) between network elements and/or to operate within or in concert with one or more other systems (e.g., the Internet and/or Web).

In one implementation, the holding cabinet system 110 and the client system 120 each include at least one device operating under the command of a control program. An example of a device is a computer processor capable of responding to and executing instructions in a defined manner. Other examples include a general or special-purpose computer, a personal computer ("PC"), a workstation, a server, a laptop, an Web-enabled telephone, a Web-enabled personal digital assistant ("PDA"), an interactive television set, a settop box, video tape recorder ("VTR"), digital video disc ("DVD") player, an on-board (i.e., vehicle-mounted) computer, or any other component, machine, tool, equipment, or some combination thereof capable of responding to and executing instructions.

An example of a control program is a software application (e.g., operating system, browser application, microbrowser application, server application, proxy application, gateway application, tunneling application, communication application, and/or ISP client application) loaded on a device. Other examples include a computer program, a piece of code, an instruction, another device, or some combination thereof, for independently or collectively instructing the device to interact and operate as desired. The control program may be embodied permanently or temporarily in any type of machine, component, physical or virtual equipment, storage medium, or propagated signal capable of providing instructions to a device. In particular, the control program (e.g., software application, computer program) may be stored on a storage media (e.g., ROM, magnetic diskette, or propagated signal) or device readable by a general or special purpose programmable computer, such that if the storage media or device is read by a computer system, the functions described herein are performed.

The network 130 may include one or more delivery systems for directly or indirectly connecting the cabinet holding system 110 and the client system 120 irrespective of physical separation. Examples of delivery systems include, but are not limited to, a local area network ("LAN"), a wide area network ("WAN"), the Internet, the Web, a telephony network (e.g., analog, digital, wired, wireless, PSTN, ISDN, or XDSL), a radio network, a television network, a cable network, a satellite network, and/or any other wired or wireless communications network configured to carry data. Each network may include one or more elements, such as, for example, intermediate nodes, proxy servers, routers, switches, adapters, and wired or wireless data pathways, configured to direct and/or deliver data.

In some implementations, the holding cabinet system 110 may include a network interface (e.g., a RS485 to RF and/or a RS485 to IR communication card) for transmitting real time holding cabinet information to the client system 120. In such cases, the client system 120 typically will include a mobile device such as an Internet enabled-handheld device, Internet-enabled mobile telephone, or laptop computer. The client system 120 also may include a mobile device specifically configured to communicate with the holding cabinet system 110.

In some implementations, the holding cabinet system 110 may include a web server system that provides real time holding cabinet information over the Internet and/or World Wide Web. In such cases, the holding cabinet information may be represented as specially formatted text files (e.g., Web pages) written in Hypertext Markup Language ("HTML") or some other markup language, such as XML, HDML, and/or VRML. Each text file may be identified by a network address such as a Universal Resource Locator ("URL"). A typical Web page may include one or more hyperlinks referring to the network addresses of other web pages. Hyperlinks may be displayed as underlined text or graphical images that when clicked, send a request for the associated page. For example, hyperlinks representing each holding cabinet in a particular restaurant may be presented. When a particular hyperlink is selected, the web page including the requested holding cabinet information may be downloaded and displayed.

To view the holding cabinet information over the Internet and/or World Wide Web, the client system 120 typically will use a browser application. The browser application may employ a communications protocol such as Hypertext Transfer Protocol ("HTTP") to request pages from Web server system of the holding cabinet system 110. In implementations where holding cabinet information is maintained for several different establishments, users may be required to provide a password to view particular Web pages. Password and/or other security measures may be used to ensure that only authorized users view secure Web pages.

FIGS. 5a–5d illustrate aspects of various holding cabinet displays according to one embodiment of the present invention. Each of the holding cabinet displays may be presented on a display panel. The display panel may include light emitting diodes (LEDs) and have touch screen functionality. The holding cabinet displays also may be presented on a display screen of a client device (e.g., Internet enabled-handheld device, Internet-enabled mobile telephone, PC and/or laptop computer). In such cases, the displays may include graphical representations of a holding cabinet display panel, a holding cabinet shelving unit, and/or a holding cabinet.

In one implementation, the shelving unit 12a includes a display panel 18a configured to present a user interface for conveying information regarding food products stored in the food holding cabinet and for receiving operator input. The user interface may incrementally present combinations of food product displays according to the number and position of food products within the passageway 16a. For example, when four food products are positioned in the passageway 16a (e.g., FIG. 5a), the user interface may include four food product displays. When one food product is positioned within the passageway 16a (e.g., FIG. 5d), the user interface may include a single food product display spanning the width of the display panel 18a. In this way, different combinations of individual food products may be stored with the appropriate display information appearing above each food product.

Figure 5A:
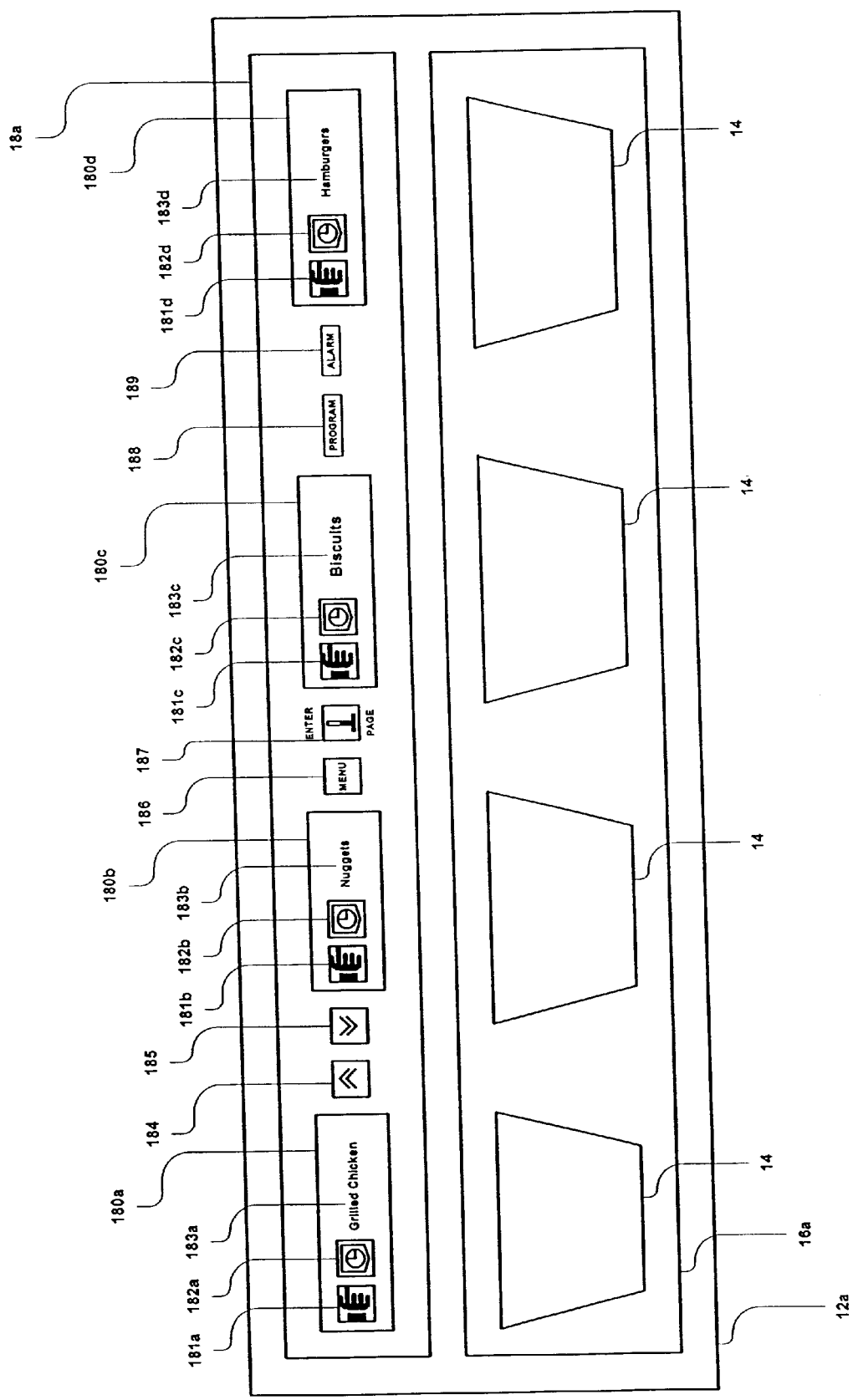
FIGS. 5a–5d illustrate aspects of various holding cabinet displays according to one embodiment of the present invention.

FIG. 5a illustrates a modular holding cabinet shelving unit 12a containing four food products 14 positioned in a passageway 16a. The holding cabinet shelving unit 12a includes a display panel 18a presenting one implementation of a holding cabinet user interface. As shown in FIG. 5a, the holding cabinet user interface includes food product displays 180a–d for conveying information regarding the stored food products. The location of the food product displays 180a–d corresponding to the position of the food products within the passageway 16a.

Each of the food product displays 180a–d respectively includes touch icons 181a–d, timer keys 182a–d, and message areas 183a–d. The touch icons 181a–d indicate to an operator that the display panel 18a includes touch screen functionality. In addition, the touch icons 181a–d locate positions of the display panel 18a that are receptive to touch input. The timer keys 182a–d respond to operator input for setting a timer associated with each food product 14.

The message areas 183a–d may display alpha-numeric messages to an operator regarding the stored food products 14. The message may convey information such as the selected mode of operation, a description of the stored food products, the shelf life remaining for each food product, and/or the temperature of each passageway. For example, when a food product is selected, the message display areas 183a–d may present a description (e.g., name, category) of the selected food product. When the timer is set, the message display areas 183a–d may present a degrading counter counting down from an initially set time value. When the temperature is set, the message display areas 183a–d may present a numeric value indicating the current and/or set temperature.

As shown in FIG. 5a, the text included in the message display 183s may be intensified (e.g., enlarged font, highlighted) to indicate the food product with the least amount of remaining shelf life. In general, the message display areas 183a–d are configured to draw attention to food products that should be used first. Varying degrees of intensity (e.g., dim, medium, bright) and size may be used to distinguish and rank the shelf life of the stored food products.

The user interface may include an up arrow key 184 and a down arrow key 185, a menu key 186, a temperature/enter/page key 187, a program, key 188, and/or an alarm key 189. The up and down arrow keys 184, 185 allow an operator to increase and decrease displayed values (e.g., temperature, time) or change selections. The menu key 186 may respond to user input and allow an operator to select an operation mode (e.g., clean mode, test mode), select meal transitions (e.g., breakfast to lunch), and/or to turn the passageway 16a on or off. The temperature/enter/page key 187 may respond to user input and allow an operator to display temperature information, enter operational changes, and/or scroll to different pages. The program key 188 may respond to user input and may allow an operator to change or select food products, meals, product positions, and/or holding temperatures. The alarm key 189 may respond to user input and allow an operator to set alarm conditions and/or enable (or disable) alarm settings.

Figure 5B:
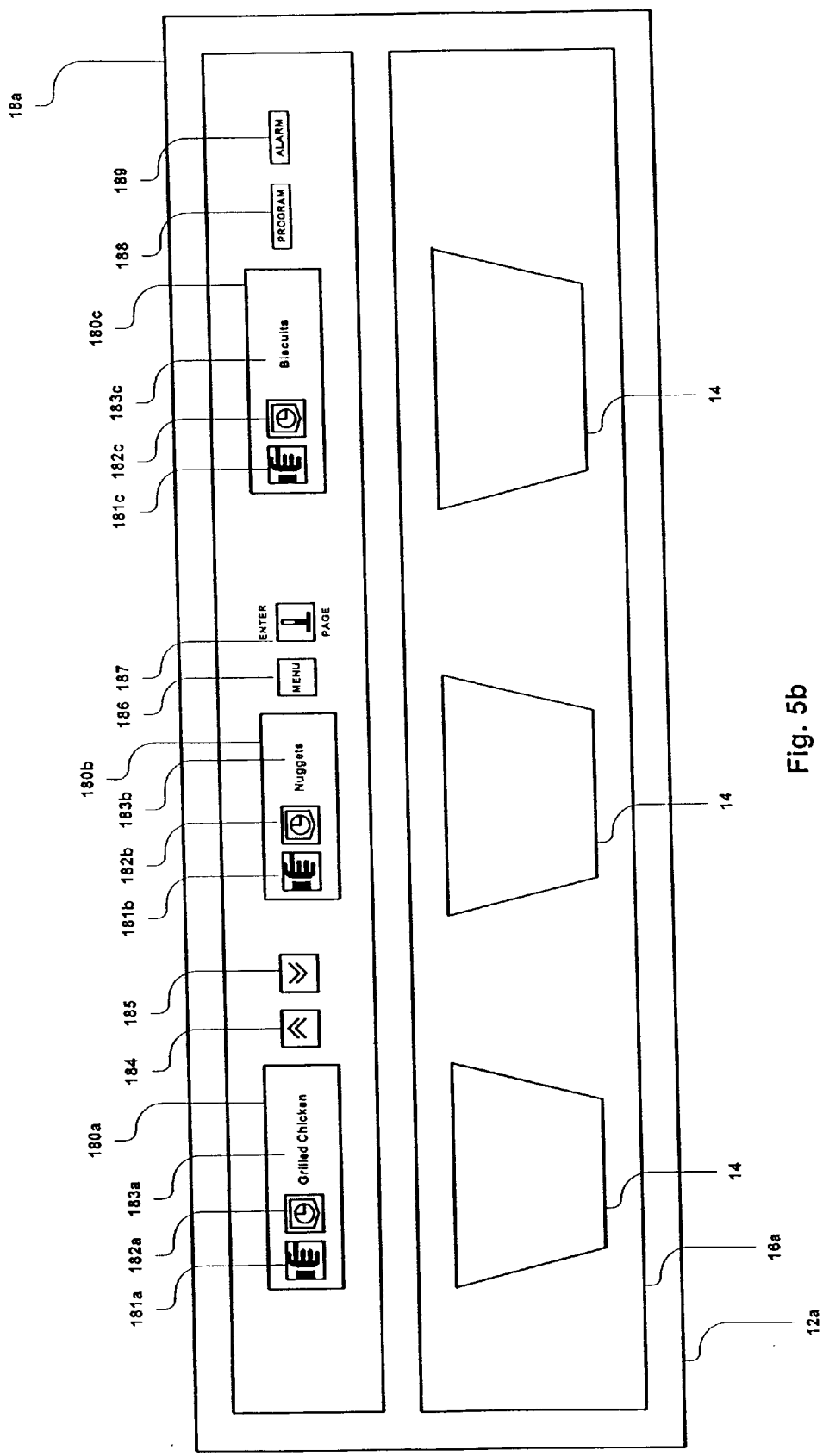
Figure 5C:
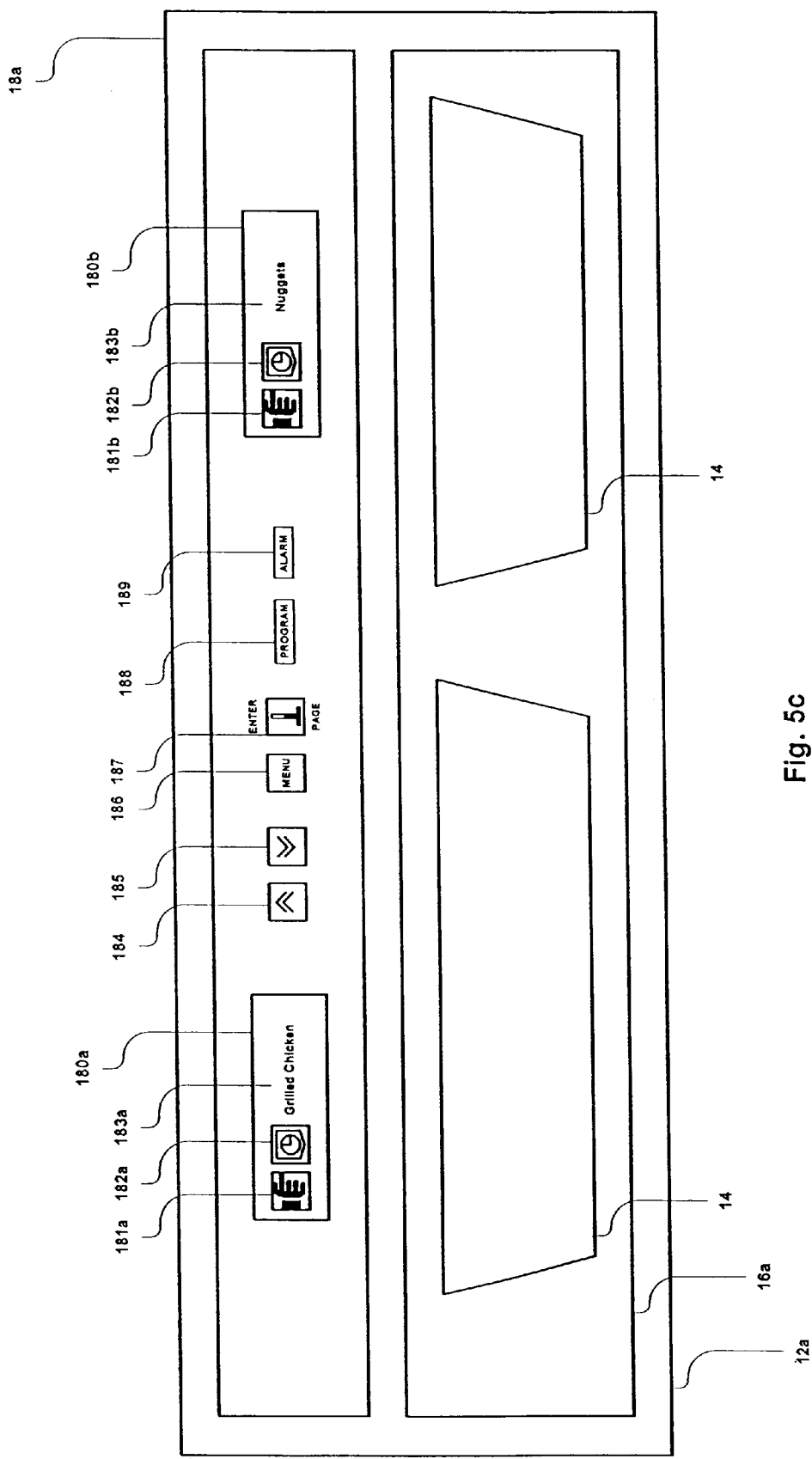
Figure 5D:
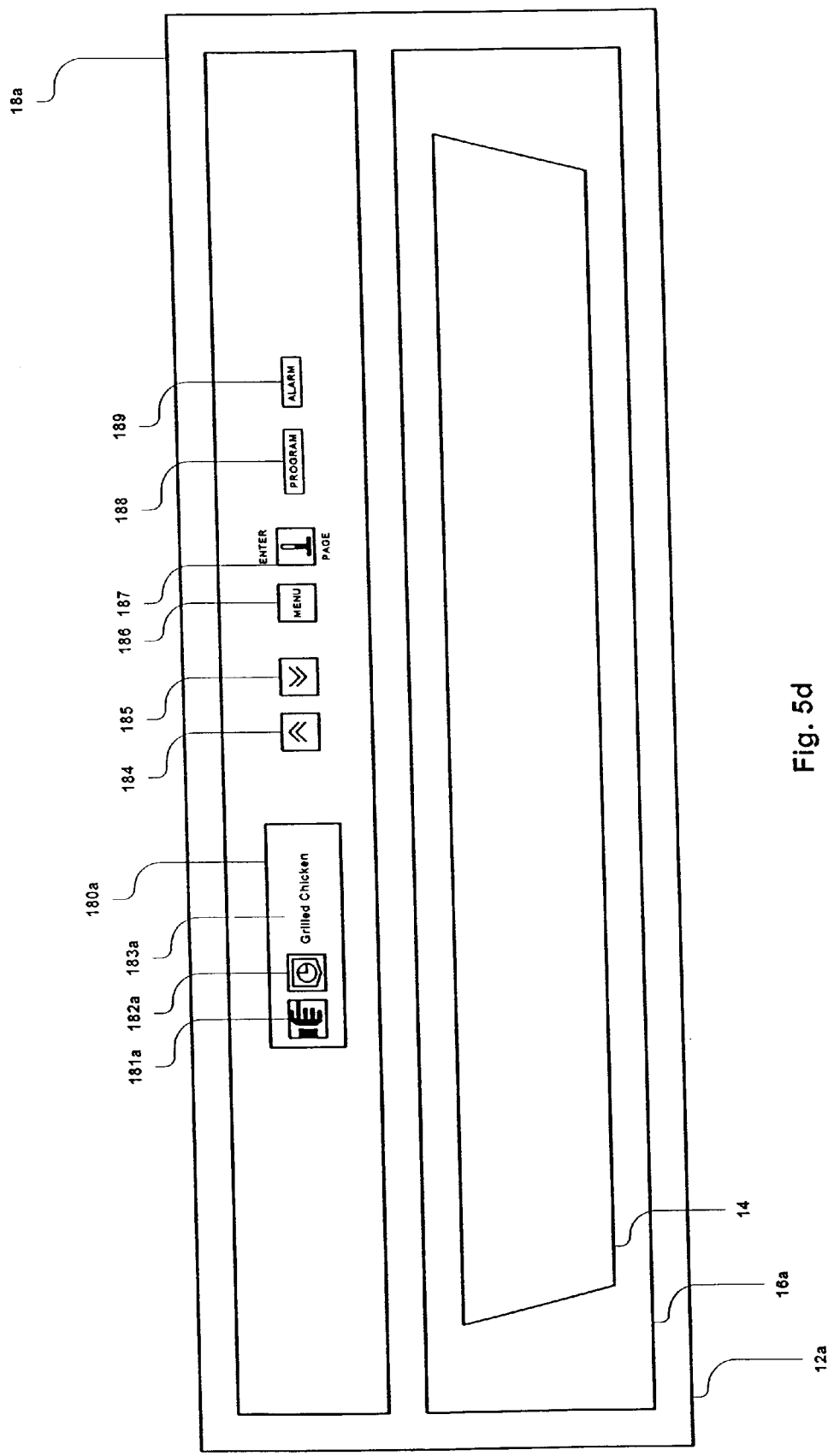

FIGS. 5b–5d illustrate a modular holding cabinet shelving unit 12a respectively containing three food products, two food products, and one food product positioned in the passageway 16a. The display panel 18a presents different user interfaces according to the number of food products and position of each food product within the passageway 16a. In particular, FIG. 5b illustrates one implementation of holding cabinet user interface including three food product displays 180*a–c* for conveying information regarding the stored food products. FIG. 5*c* illustrates one implementation of a holding cabinet user interface including two food product displays 180*a–b* for conveying information regarding the stored food products. FIG. 5*d* illustrates one implementation of a holding cabinet user interface including a single food product display 180*a* for conveying information regarding the stored food product.

As shown, the location of the food product displays within each user interface corresponds to the position of the food products within the passageway 16*a*. The locations of the arrow keys 184, 185, the menu key 186, the temperature/enter/page key 187, the program key 188, and/or the alarm key 189 may vary depending on the number of food products and position of each food product within the passageway 16*a*.

A number of implementations have been described. Nevertheless, it will be understood that various modifications may be made. For example, in some implementations, the holding cabinet may include more or less than four shelving units. Additionally, each shelving unit may be capable of storing more or less than four categories or types of food products. In some implementations, the main controller may control the operation of the entire holding cabinet and/or may perform all of the functions of the display controllers. Furthermore, in some implementations, a modular unit may include more than one shelving unit.

Other implementations are within the scope of the following claims.

What is claimed is:

1. A cabinet for maintaining one or more food products at a predetermined temperature, the cabinet comprising:
  at least one modular shelving unit capable of interconnecting with one or more additional modular shelving units, each modular shelving unit including:
    a passageway for storing food products, the passageway having a width dimension capable of storing at least two food products;
    a display for presenting information regarding food products stored in the passageway; and
    a control system for individually controlling the operations of the modular shelving unit including controlling the temperature of the passageway and controlling the presentation of information by the display.

2. The cabinet of claim 1, wherein the modular shelving unit comprises at least one bezel assembly, the bezel assembly including a display screen and a slot forming an opening of the passageway.

3. The cabinet of claim 2, wherein the modular shelving unit comprises at least two bezel assemblies.

4. The cabinet of claim 2, wherein the display screen comprises a vacuum florescent display.

5. The cabinet of claim 2, wherein the display screen includes touch screen functionality.

6. The cabinet of claim 2, wherein at least part of the control system is included within the bezel assembly.

7. The cabinet of claim 1, wherein the modular shelving unit comprises a heater assembly for maintaining food products at a particular temperature, the heater assembly including frame components supporting a top heater plate and bottom heater plate.

8. The cabinet of claim 7, wherein the frame components include interconnection wiring capable of communicating with interconnection wiring of one or more additional modular shelving units.

9. The cabinet of claim 7, wherein the heater assembly comprises a temperature sensor for providing temperature detection signals to the control system.

10. The cabinet of claim 7, wherein at least part of the control system is included in the heater assembly.

11. The cabinet of claim 1, wherein the modular shelving unit comprises a position sensor for detecting location of food products within the passageway.

12. The cabinet of claim 11, wherein the position sensor provides position indication signals to the control system.

13. The cabinet of claim 1, wherein the control system comprises switching circuitry for controlling the temperature of the passageway.

14. The cabinet of claim 1, wherein the control system comprises a network interface for sending and receiving communication data.

15. The cabinet of claim 14, wherein the network interface comprises at least one of a modem, communication card, transmitter, and network adapter.

16. The cabinet of claim 14, wherein the communication data comprises at least one of infrared communication data and radio frequency communication data.

17. The cabinet of claim 14, wherein the communication data is capable of being rendered by a wireless communications device as a substantially real-time representation of an operating condition of the cabinet.

18. The cabinet of claim 1, further comprising at least two modular units.

19. A cabinet for maintaining one or more food products at a predetermined temperature, the cabinet comprising:
  at least one modular shelving unit capable of interconnecting with one or more additional modular shelving units, each modular shelving unit including:
    holding means for storing food products, the holding means capable of storing at least two food products;
    display means for presenting information regarding food products stored by the holding means; and
    control means for individually controlling the operations of the modular shelving unit including controlling the temperature of the holding means and controlling the presentation of information by the display means.

20. A modular shelving unit, comprising:
  a passageway for storing food products, the passageway having a width dimension capable of storing at least two food products;
  a display for presenting information regarding food products stored in the passageway; and
  a control system for individually controlling the operations of the modular shelving unit including controlling the temperature of the passageway and controlling the presentation of information by the display,
  wherein the modular shelving unit is capable of interconnecting with one or more additional modular shelving units to form a cabinet for maintaining one or more food products at a predetermined temperature.

\* \* \* \* \*

UNITED STATES PATENT AND TRADEMARK OFFICE
CERTIFICATE OF CORRECTION

PATENT NO. : 6,658,994 B1  Page 1 of 1
DATED : December 9, 2003
INVENTOR(S) : Thomas A. McMillan It is certified that error appears in the above-identified patent and that said Letters Patent is hereby corrected as shown below:

<u>Column 1,</u>
Line 19, delete "delivery" and substitute therefor -- deliver --.
Line 25, delete "display" and substitute therefor -- delay --.

<u>Column 2,</u>
Line 59, delete "entrees" and substitute therefor -- entrées --.

<u>Column 3,</u>
Line 35, delete "greater below" and substitute therefor -- greater detail below --.

<u>Column 8,</u>
Line 28, delete "an Web-enabled telephone," and substitute therefor --
-- a Web-enabled telephone, --.
Line 28, delete "XDSL" and substitute therefor -- xDSL --.

Signed and Sealed this

Eighth Day of June, 2004

JON W. DUDAS
*Acting Director of the United States Patent and Trademark Office*